Jan. 26, 1954 W. G. SHERMAN 2,667,253
CLUTCH WITH TOGGLE LEVER OPERATOR
Filed Oct. 10, 1950 2 Sheets-Sheet 1

INVENTOR
William G. Sherman,
BY
ATTORNEYS

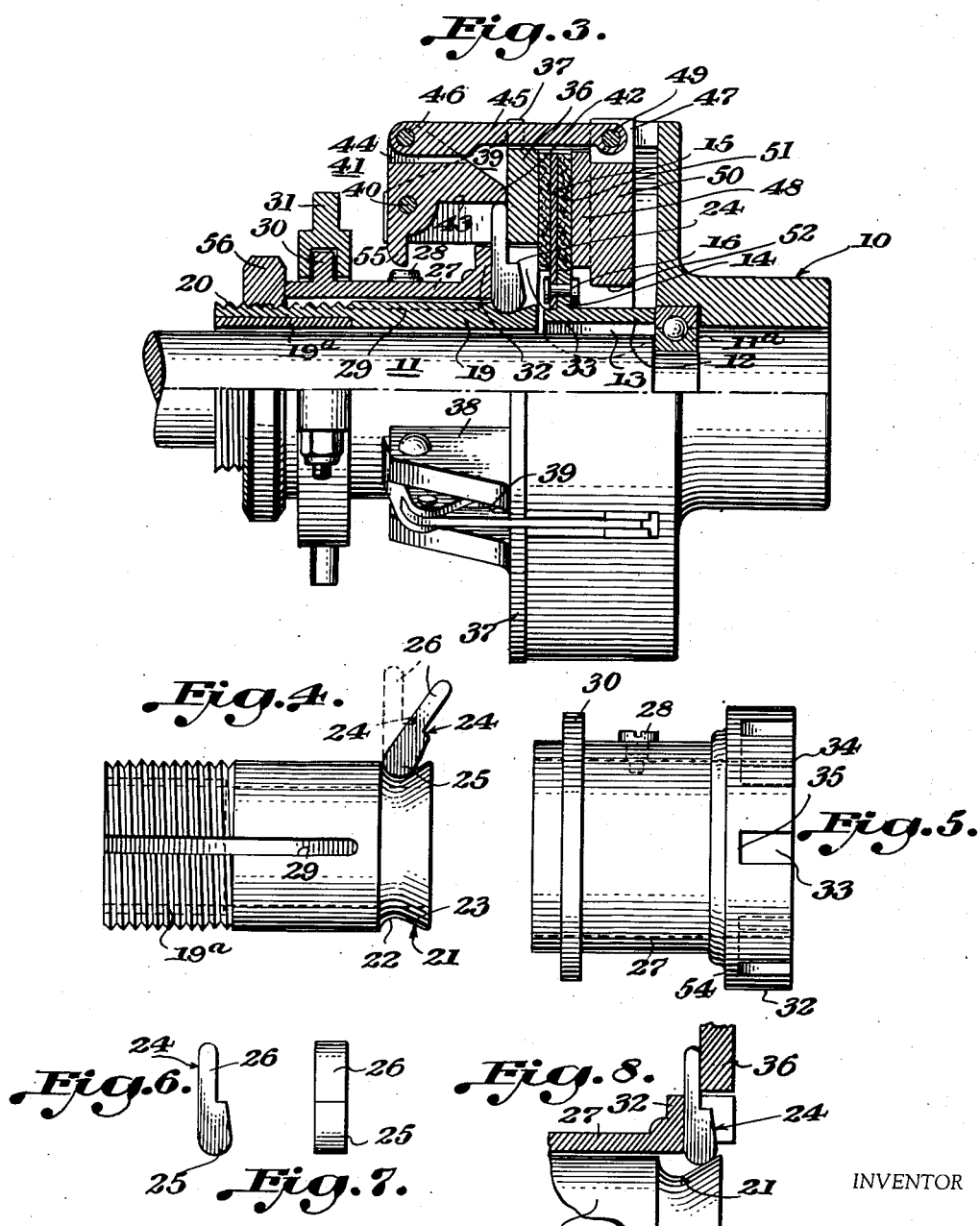

Patented Jan. 26, 1954

2,667,253

UNITED STATES PATENT OFFICE 2,667,253

CLUTCH WITH TOGGLE LEVER OPERATOR

William G. Sherman, Seattle, Wash.

Application October 10, 1950, Serial No. 189,338

12 Claims. (Cl. 192—99)

This invention relates to friction clutches and has as an object the presentation of a simplified clutch structure in which engagement between the clutch disc and pressure plates is effected by means of cam members devoid of the customary levers or rollers which might bend or stick to hamper efficient operation of the mechanism.

Another object of the invention is the provision of appropriate contact portions on cooperating elements of the mechanism which will insure positive release of the clutch plate without the use of springs.

Still another object of my present invention is to provide a novel clutch actuating mechanism which will apply force to the outer peripheral portion of the pressure plate thus preventing buckling, due to heating of the clutch from slippage.

A further advantage of the device lies in the fact that it contains a simple adjustment means to compensate for wear of the clutch parts.

These and other objects and advantages will become apparent from the following description of the present invention illustrated in the accompanying drawings, in which:

Figure 3 is a sectional view of the upper portion of the device showing the clutch engaged;

Figure 4 is a detail view of the cam adjusting sleeve;

Figure 5 is a detail view of the cam actuator sleeve;

Figures 6 and 7 are detail elevational views of the cam fingers used in the device;

Figure 8 is a detail view showing adjustment of the camming mechanism to compensate for wear of the pressure plate.

Similar reference characters represent similar parts in the several figures.

Figure 2:
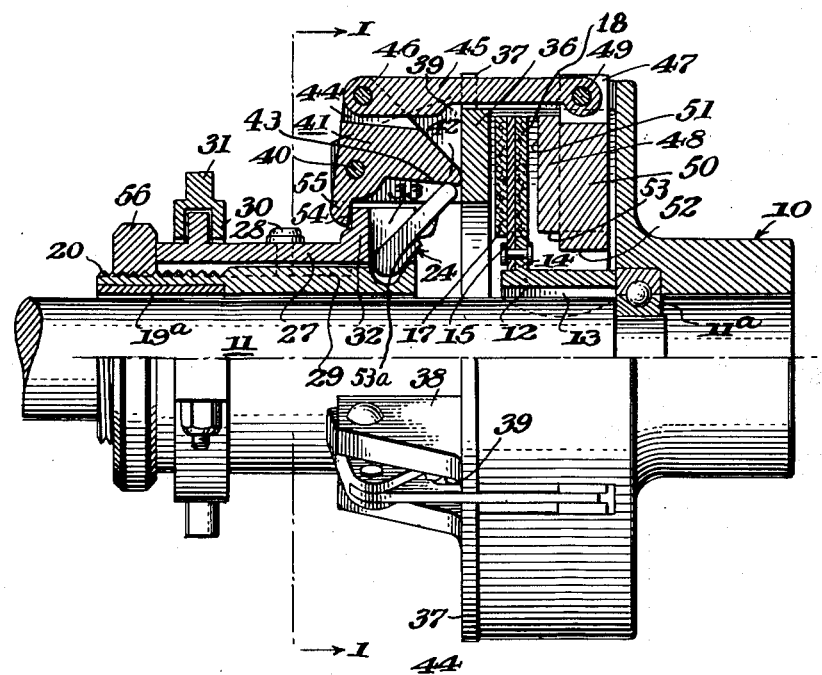
Figure 2 is an elevational view of the device with the clutch disengaged showing the upper half thereof in section.
Figure 1:
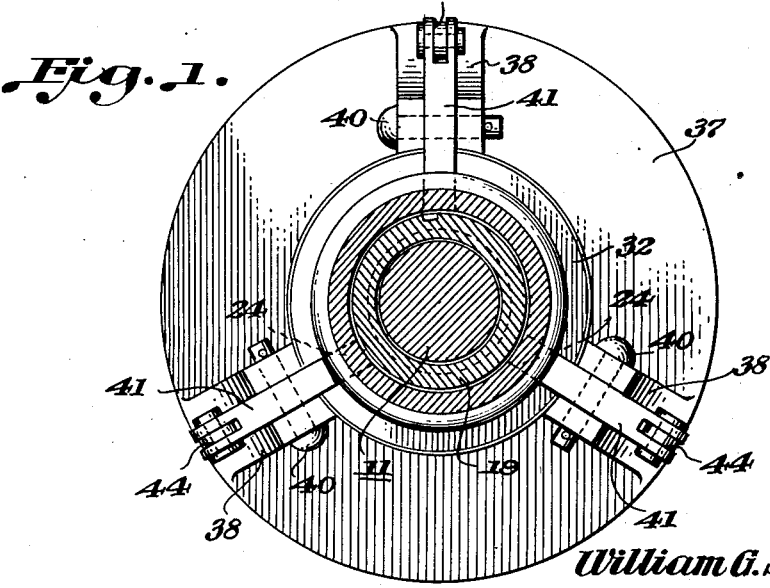
Figure 1 is a section view taken on line 1—1 of Figure 2.

With the problem of maintenance as well as operation in mind, I have perfected the novel clutch construction shown in the accompanying drawings. As best seen in Figure 2 the clutch concerns a driving member in the form of a hub 10 and a driven shaft 11. The driven shaft is supported within the hub by means of an anti-friction bearing ring 11a and carries on its inner end a collar 12 which is secured to the shaft by a key 13. A peripheral flange 14 provides a holding means to which a clutch disc 15 may be attached by means of rivets 16 or the like. The disc is of course provided with the usual friction pads or face plates 17 and 18. It should be noted that hub 10 has a cup-shaped portion within which collar 12, flange 14, disk 15, and plates 17 and 18 are mounted.

Outwardly of the clutch plate, the driven shaft is encircled by an adjustment sleeve 19 which is freely movable with respect to the shaft and has a bronze bearing bushing 19a inserted therein. This sleeve is externally threaded at its outer end as shown at 20 and is formed at its inner end with an annular peripheral groove 21 substantially conical in configuration (see Fig. 4). Groove 21 has a rounded depressed portion 22 and an inclined portion tapering outwardly toward the periphery of the sleeve as shown at 23. Seated in groove 21 are three cam arms 24 spaced 120 degrees from one another about the sleeve. Each cam arm has an enlarged rounded base portion 25 and an offset finger 26.

Referring once again to Figure 2 it will be seen that the above-mentioned cam arms are activated by a sleeve 27 having an internal diameter slightly greater than the external diameter of adjustment sleeve 19 whereby sleeve 27 may be slipped over the latter and the two secured for mutual rotation by a dowel screw 28 and a cooperating keyway 29 formed in the inner sleeve. The thrust sleeve 27 has a peripheral flange 30 formed at its outer end and this flange retains the usual shifter band 31 in position on the thrust sleeve for reciprocation of said sleeve upon operation of the clutch lever or pedal (not shown).

The innermost end of the thrust sleeve is formed with a peripheral abutment flange 32 having three milled slots 33 extending inwardly from the face 34 of the sleeve element (see Fig. 5). The inner wall 35 acts as a contact face to retain its associated cam arm 24 in the conical groove and further to limit the pivotal movement of the arm as will become apparent.

Figure 2 shows how the rounded end of the finger portion 26 of each cam arm contacts what may be termed the outer pressure plate 36. This plate has an annular rim 37 which contacts the open end of hub 10 with the actual pressure portion of the assembly extending into said hub. The exposed face of the pressure plate assembly is formed with three forked projections 38 each defining a slot 39 to be radially alined with one of the aforementioned milled slots 33 in the thrust sleeve, all of these slots of course being equally spaced on 120 degree centers. The lower edges of projections 38 are sufficiently spaced from the axis of the drive shaft to permit the reception of abutment flange 32 therebeneath.

A pin 40 bridging each slot 39 serves as a pivot for a bell crank 41 substantially triangular in shape as seen in Figures 2 and 3. The bell crank has an inwardly extending leg 42 the lower edge 43 of which is the cam surface upon which the end of arm 24 acts. At the apex of the bell crank there is provided a milled slot 44 in which one end of a toggle link 45 is pivotally retained by the pin 46. The remote end of each link 45 fits within a slot 47 in the periphery of an inner pressure plate 48 and the link is pivotally secured to the plate by means of a pin 49. The slots 47 are in reality formed by the bifurcated ends of radial studs 50 integral with one face of the pressure plate. The opposite face 51 of the plate is the contacting surface which engages the friction pad 18 on the clutch disc. Proper clearance between the pressure plate and collar 12 is provided by the central opening 52 in the plate. Furthermore to accommodate rivets 16 when the clutch is engaged the opening is enlarged as shown at 53. The pressure plates are fabricated of steel parts for light weight and heat dissipation.

In the operation of the device as thus far described, when the shifter band 31 is actuated the sleeves 27 and 19 will shift forwardly causing the cam arms 24 to pivot in the conical groove 21. Since the end 26 of each cam arm abuts the outer pressure plate 36, this shifting of the base of the arms causes each arm to assume a position perpendicular to the axis of the shaft 11 seen in Figure 3 with the fingers 26 acting as a back-up for the force exerted by the pressure plate on one face of the clutch plate. It is seen that the cam arms have a pressure surface 53a which engages the pressure plate. It is seen that the cam arms have a pressure surface which engages the pressure plate.

Observing Figures 2 and 3 of the drawings, it will be seen that the upward swing of ends of cam arms 24 causes a counter-clockwise movement of the bell crank 41 about its axis at 42. The pivot pin 46 is thus moved away from the clutch plate carrying link 45 in the same direction whereupon the inner pressure plate 48 engages one friction pad of the clutch plate and the clutch is engaged as shown in Figure 3. Referring to Figure 6 it will be noted the centers of the base portion 25 and the finger portion 26 of each cam arm are offset with respect to one another. The amount of this offset is preferably around $\frac{3}{32}$ inch and permits a slight over-travel of the camming mechanism which will hold the clutch in engagement.

An important feature of the invention is that provision has been made for positive release of the clutch plate without the customary use of springs or the like. The flange 32 of the actuator sleeve has an abutment face 54 which contacts a depending lug 55 at one corner of each triangular bell-crank 41. When the shifter band 31 is activated to withdraw sleeve 27 flange 32 of this sleeve is confronted by the depending lugs and in moving strikes the lugs causing a reverse rotation of the bell-cranks forcing links 45 to the right as viewed in Figures 2 and 3. This action of course spreads the opposing pressure plates and positively forces these plates from contact with the friction pads of the clutch disc.

Obviously, continued use of the clutch will cause the clutch plate friction pads to wear and become thinner. Figure 3 shows the relationship between the various elements when the clutch lining is full thickness. As the lining wears an internally threaded nut 56 on the outer end of sleeve 19 may be adjusted inwardly causing the actuator sleeve 27 to slide forwardly on the sleeve 19 so that the contact face 34 of flange 32 will over-hang the conical groove 21. As seen in Figure 8 this positions the cam arms 24 closer to the clutch disc 15 and will insure that the pressure plates will be moved into engagement with the clutch member with sufficient force regardless of the reduction in thickness of the friction pads.

The numerous advantages of the construction of this clutch mechanism are apparent from the foregoing description of the device. The lifting of the bell-cranks by the cam arm exerts a pull on links 45 so that regardless of the force applied there is no possibility of deflection or bending of the linkage as in other clutch designs. The absence of rollers is also advantageous since rollers in a clutch mechanism invariably develop flat spots when they become rusted or stuck and refuse to rotate. Due to the fact that the bell-cranks and associated linkage are positively held in the engaged and disengaged position by the cam arms and face 54 of the abutment flange respectively there is not the occasion for the rattling that usually accompanies the moving parts of clutch mechanisms.

The useable life of the clutch friction pads is materially increased by the positive release of the pressure plates, this being accomplished by the shifting mechanism and not with the use of springs. The obvious simplicity of construction makes it possible for parts to be used for a number of clutch sizes with very few changes.

While I have shown and described a preferred form of my invention, it will be understood that variations in details of form may be made without departure from the invention as defined in the appended claims.

I claim:

1. A clutch mechanism comprising a driving member and a driven member, a clutch plate keyed to one of said members and a hub keyed to the other, pressure plates disposed at opposite sides of the clutch plate and engaged with said hub for rotation therewith, a plurality of bell-crank members pivotally connected to one of said pressure plates, links connecting the bell-crank members and the other of said pressure plates, said bell-cranks being rotatable in one direction to move said pressure plates into engagement with said clutch plate and rotatable in another direction to move said pressure plates out of engagement with said clutch plate, a sleeve shiftably mounted on one of said members having means forming a groove in one end thereof, cam arms pivotally retained in said groove and each having a free end contacting one of the bell-crank members for rotation of said bell-crank member upon movement of said sleeve.

2. A clutch mechanism comprising a driving member and a driven member, a clutch plate keyed to one of said members and a hub keyed to the other, pressure plates disposed at opposite sides of the clutch plate and engaged with said hub for rotation therewith, a plurality of bell-crank members pivotally connected to one of said pressure plates, links connecting the bell-crank members and the other of said pressure plates, said bell-cranks being rotatable in one direction to move said pressure plates into engagement with said clutch plate and rotatable in another direction to move said pressure plates out of engagement with said clutch plate, a sleeve shiftably mounted on one of said members having means forming a groove in one end thereof, cam arms pivotally retained in said groove and each having a free end contacting one of the bell-crank members for rotation of said bell-crank member upon movement of said sleeve, said cam arms having a pressure surface adapted to contact the pressure plate carrying the bell-crank members for forcing said plate against the clutch plate.

3. A clutch mechanism comprising a driving member and a driven member, a clutch plate keyed to one of said members and a hub keyed to the other, pressure plates disposed at opposite sides of the clutch plate and engaged with said hub for rotation therewith, a plurality of bell-crank members pivotally connected to one of said pressure plates, links connecting the bell-crank members and the other of said pressure plates, said bell-cranks being rotatable in one direction to move said pressure plates into engagement with said clutch plate and rotatable in another direction to move said pressure plates out of engagement with said clutch plate, a sleeve shiftably mounted on one of said members having means forming an inclined peripheral groove at one end adjacent the clutch plate, cam arms pivotally retained in said groove and each having a free end contacting a bell-crank member upon movement of the sleeve, said cam arms also contacting the pressure plate carrying the bell-crank members for forcing said plate against the clutch plate.

4. A clutch mechanism comprising a driving member and a driven member, a clutch plate keyed to one of said members and a hub keyed to the other, pressure plates disposed at opposite sides of the clutch plate and engaged with said hub for rotation therewith, a plurality of bell-crank members pivotally connected to one of said pressure plates, links connecting the bell-crank members and the other of said pressure plates, said bell-cranks being rotatable in one direction to move said pressure plates into engagement with said clutch plate and rotatable in another direction to move said pressure plates out of engagement with said clutch plate, a sleeve shiftably mounted on one of said members having means forming an inclined peripheral groove at one end adjacent the clutch plate, cam arms pivotally retained in said groove and each having a free end contacting a bell-crank member upon movement of the sleeve, said cam arms also contacting the pressure plate carrying the bell-crank members for forcing said plate against the clutch plate, and means carried by said sleeve for adjusting the cam arms axially of the sleeve and within said inclined groove.

5. A clutch mechanism comprising a driving member and a driven member, a clutch plate keyed to one of said members and a hub keyed to the other, pressure plates disposed at opposite sides of the clutch plate and engaged with said hub for rotation therewith, a plurality of bell-crank members pivotally connected to one of said pressure plates, links connecting the bell-crank members and the other of said pressure plates, said bell-cranks being rotatable in one direction to move said pressure plates into engagement with said clutch plate and rotatable in another direction to move said pressure plates out of engagement with said clutch plate, a sleeve shiftably mounted on one of said members having means forming an inclined peripheral groove at one end adjacent the clutch plate, cam arms pivotally retained in said groove and each having a free end contacting a bell-crank member upon movement of the sleeve, said cam arms also contacting the pressure plate carrying the bell-crank members for forcing said plate against the clutch plate, a second sleeve surrounding said shiftable sleeve and adjustable axially thereof to selectively position the cam arms in said groove toward the clutch plate to accommodate wear of said clutch plate.

6. A clutch mechanism comprising a driving member and a driven member, a clutch plate keyed to one of said members and a hub keyed to the other, pressure plate disposed at opposite sides of the clutch plate and engaged with said hub for rotation therewith, a plurality of bell-crank members pivotally connected to one of said pressure plates, links connecting the bell-crank members and the other of said pressure plates, said bell-cranks being rotatable in one direction to move said pressure plates into engagement with said clutch plate and rotatable in another direction to move said pressure plates out of engagement with said clutch plate, a sleeve shiftably mounted on one of said members having means forming an inclined peripheral groove at one end adjacent the clutch plate, cam arms pivotally retained in said groove and each having a free end contacting a bell-crank member upon movement of the sleeve, said cam arms also contacting the pressure plate carrying the bell-crank members for forcing said plate against the clutch plate, a second sleeve surrounding said shiftable sleeve and adjustable axially thereof to selectively position the cam arms in said groove toward the clutch plate to accommodate wear of said clutch plate, and an abutment on said second sleeve adapted to selectively contact said bell-crank for counter-rotation thereof whereby the pressure plates are positively moved from engagement with the clutch plate.

7. A clutch mechanism comprising a driving member and a driven member, a clutch plate keyed to one of said members and a hub keyed to the other, pressure plates disposed at opposite sides of the clutch plate and engaged with said hub for rotation therewith, a plurality of substantially triangular bell-crank members pivotally connected to one of said pressure plates, a link connecting a corner of each bell-crank to the other pressure plate, said bell cranks being rotatable in one direction to move said pressure plates into engagement with said clutch plate and rotatable in another direction to move said pressure plates out of engagement with said clutch plate, a sleeve shiftably mounted on one of said members and cam arms carried by said sleeve and contacting the bell-crank members at another corner thereof for rotation of said bell-crank members.

8. A friction clutch mechanism comprising a driving hub and a driven shaft, a clutch plate keyed to said driven shaft, apertured pressure plates surrounding said shaft and disposed on opposite sides of the clutch plate, one pressure plate being interlocked for mutual rotation with the hub, the second pressure plate having a plurality of three cornered bell-cranks pivotally secured thereto, a link connecting one corner of each bell-crank to the first pressure plate, a shiftable sleeve surrounding said shaft and having a peripheral conical groove in one end adjacent said clutch plate, a plurality of cam arms freely seated in the bottom of said groove, said arms each having a free end adapted to bear upon a second corner of each bell-crank for rotation of the bell-crank upon movement of the shiftable sleeve to the clutch plate whereby the pressure plates move toward one another to engage the clutch plate, said cam arms also contacting the second pressure plate to force it against the clutch plate.

9. A friction clutch mechanism comprising a driving hub and a driven shaft, a clutch plate keyed to said driven shaft, apertured pressure plates surrounding said shaft and disposed on opposite sides of the clutch plate, one pressure plate being interlocked for mutual rotation with the hub, the second pressure plate having a plurality of three cornered bell-cranks pivotally secured thereto, a link connecting one corner of each bell-crank to the first pressure plate, a shiftable sleeve surrounding said shaft and having a peripheral conical groove in one end adjacent said clutch plate, a plurality of cam arms freely seated in the bottom of said groove, said arms each having a free end adapted to bear upon a second corner of each bell-crank for rotation of the bell-crank upon movement of the shiftable sleeve to the clutch plate whereby the pressure plates move toward one another to engage the clutch plate, said cam arms also contacting the second pressure plate to force it against the clutch plate, a second sleeve surrounding the shiftable sleeve and contacting the cam arms, said second sleeve being adjustable to position the cams along the inclined side of the groove to accommodate wear of the clutch plate.

10. A friction clutch mechanism comprising a driving hub and a driven shaft, a clutch plate keyed to said driven shaft, apertured pressure plates surrounding said shaft and disposed on opposite sides of the clutch plate, one pressure plate being interlocked for mutual rotation with the hub, the second pressure plate having a plurality of three cornered bell-cranks pivotally secured thereto, a link connecting one corner of each bell-crank to the first pressure plate, a shiftable sleeve surrounding said shaft and having a peripheral conical groove in one end adjacent said clutch plate, a plurality of cam arms freely seated in the bottom of said groove, said arms each having a free end adapted to bear upon a second corner of each bell-crank for rotation of the bell-crank upon movement of the shiftable sleeve to the clutch plate whereby the pressure plates move toward one another to engage the clutch plate, said cam arms also contacting the second pressure plate to force it against the clutch plate, a second sleeve surrounding the shiftable sleeve and contacting the cam arms, said second sleeve being adjustable to position the cams along the inclined side of the groove to accommodate wear of the clutch plate, cooperating abutments on said second sleeve and the bell-cranks whereby movement of the shiftable sleeve away from the clutch plate will counter-rotate the bell-cranks causing positive disengagement of the pressure plates and clutch plate.

11. A clutch mechanism comprising a driving member and a driven member, a clutch plate keyed to one of said members and a hub keyed to the other, pressure plates disposed at opposite sides of the clutch plate and engaged with said hub for rotation therewith, a plurality of bell-crank members pivotally connected to one of said pressure plates, links connecting the bell-crank members and the other of said pressure plates, said bell-cranks being rotatable in one direction to move said pressure plates into engagement with said clutch plate and rotatable in another direction to move said pressure plates out of engagement with said clutch plate, a sleeve shiftably mounted on one of said members having means forming a groove in one end thereof, cam arms each comprising a base portion and a finger, said base portion rotatably contacting the surface of said groove, said finger contacting one of said bell-crank members for rotation of said bell-crank member upon movement of said sleeve.

12. A clutch mechanism comprising a driving member and a driven member, a clutch plate keyed to one of said members and a hub keyed to the other, pressure plates disposed at opposite sides of the clutch plate and engaged with said hub for rotation therewith, a plurality of bell-crank members pivotally connected to one of said pressure plates, links connecting the bell-crank members and the other of said pressure plates, said bell-cranks being rotatable in one direction to move said pressure plates into engagement with said clutch plate and rotatable in another direction to move said pressure plates out of engagement with said clutch plate, a sleeve shiftably mounted on one of said members having means forming a groove in one end thereof, cam arms each comprising a base portion rotatably contacting the surface of said groove and a finger, said finger of each cam arm contacting one of said bell-crank members, a second sleeve movable with respect to said shiftable sleeve so as to engage said arms to change the position of said base portion on the surface of said groove.

WILLIAM G. SHERMAN.

References Cited in the file of this patent
UNITED STATES PATENTS

| Number | Name | Date |
| --- | --- | --- |
| 427,344 | Moore et al. | May 6, 1890 |
| 505,617 | Twitt | Sept. 26, 1893 |
| 611,549 | Anderson | Sept. 27, 1898 |
| 930,859 | Hook | Aug. 10, 1909 |
| 1,725,016 | Pearmain | Aug. 20, 1929 |
| 1,880,721 | Blanchard | Oct. 4, 1932 |